(12) United States Patent
Faronius et al.

(10) Patent No.: US 10,771,136 B2
(45) Date of Patent: Sep. 8, 2020

(54) OVERLAID-CODED BEAMFORMING

(71) Applicant: Telefonaktiebolaget LM Ericsson (publ), Stockholm (SE)

(72) Inventors: Carola Faronius, Järfälla (SE); Torbjörn Wigren, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 324 days.

(21) Appl. No.: 15/505,954

(22) PCT Filed: Dec. 1, 2016

(86) PCT No.: PCT/SE2016/051196
§ 371 (c)(1),
(2) Date: Feb. 23, 2017

(87) PCT Pub. No.: WO2018/101867
PCT Pub. Date: Jun. 7, 2018

(65) Prior Publication Data
US 2019/0097704 A1     Mar. 28, 2019

(51) Int. Cl.
*H04B 7/06* (2006.01)
*H04B 7/0417* (2017.01)

(52) U.S. Cl.
CPC ......... *H04B 7/0617* (2013.01); *H04B 7/0421* (2013.01); *H04B 7/063* (2013.01); *H04B 7/0634* (2013.01)

(58) Field of Classification Search
CPC ... H04B 7/0617; H04B 7/0634; H04B 7/0421

USPC .................................................. 375/260, 267
See application file for complete search history.

(56) References Cited

U.S. PATENT DOCUMENTS

| | | | |
|---|---|---|---|
| 8,848,819 B2* | 9/2014 | Murakami | H04B 7/0434 375/267 |
| 2003/0064753 A1 | 4/2003 | Kasapi et al. | |
| 2014/0321563 A1 | 10/2014 | Park et al. | |
| 2016/0182196 A1* | 6/2016 | Lorca Hernando | H04L 5/0094 375/267 |
| 2017/0222693 A1* | 8/2017 | Shen | H04B 7/0408 |

\* cited by examiner

*Primary Examiner* — Fitwi Y Hailegiorgis
(74) *Attorney, Agent, or Firm* — Murphy, Bilak & Homiller, PLLC

(57) ABSTRACT

A method for radio communication between a transmitting node and receiving nodes comprises obtaining (S1) of directions from the transmitting node to the receiving nodes and antenna gains needed for each direction. A beam forming solution having a high gain in the directions of a set of receiving nodes and with antenna gains adapted to the need of the link is obtained (S2). User data to be transmitted to the receiving nodes is obtained (S3). The user data is overlay-coded (S4) by a code-domain overlaid code and/or a frequency-domain overlaid code, separately for each respective receiving node. The overlaid-coded user data is combined (S5) into at least one combined signal stream. Analogue beamforming, hybrid beamforming or constrained beam-forming is performed (S6) on the combined signal stream(s) according to the beam forming solution. The beamformed data is transmitted (S7) from the transmitting node to the receiving nodes.

26 Claims, 11 Drawing Sheets

Fig. 9
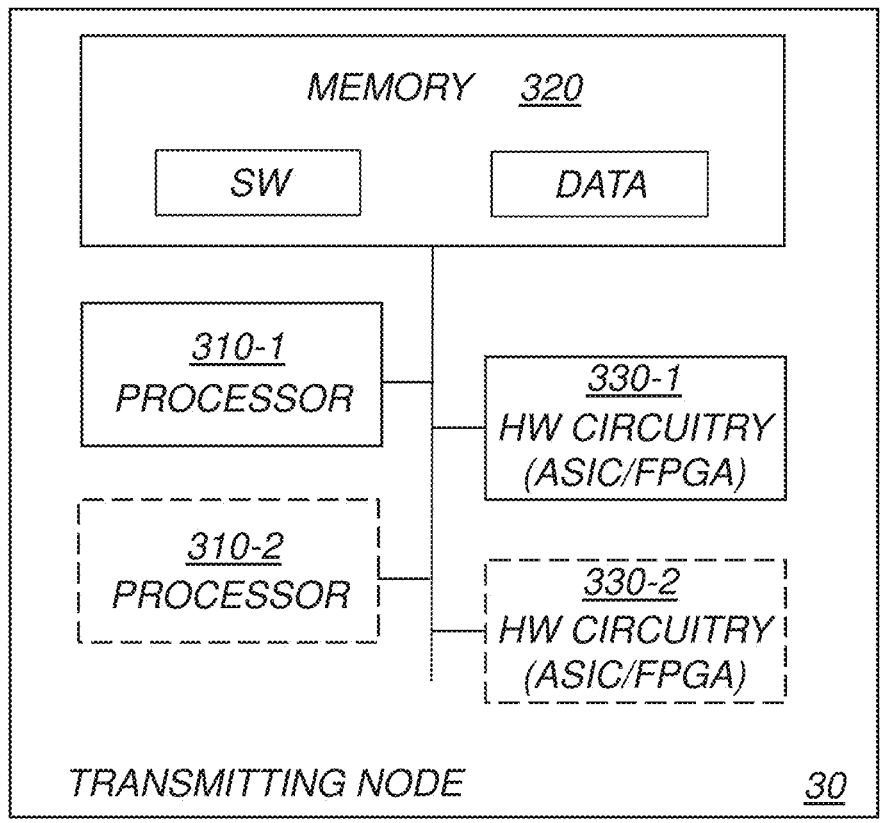
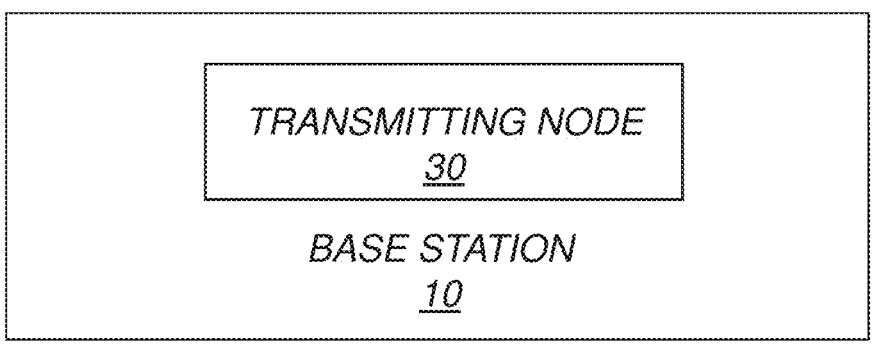
Fig. 11
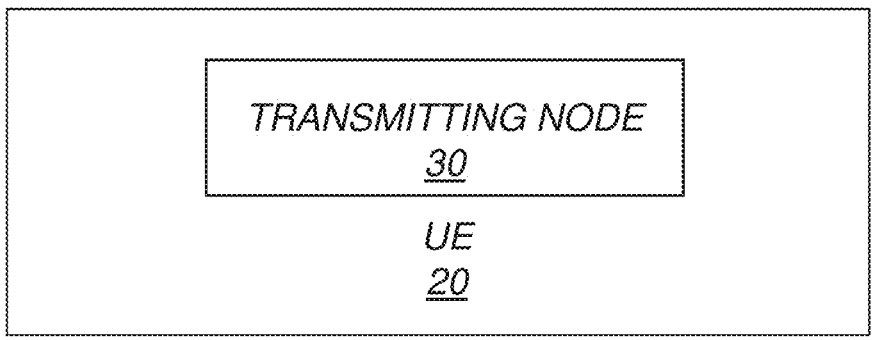
Fig. 12

OVERLAID-CODED BEAMFORMING

TECHNICAL FIELD

The proposed technology generally relates to radio communication between a transmitting node and a plurality of receiving nodes, and in particular to methods and arrangements for such radio communication using beam-forming techniques.

BACKGROUND

In the 5th Generation (5G) wireless systems in standardization, beamforming and Multiple Input Multiple Output (MIMO) transmission will be central technologies. Increasing capacity requirements is driving this development where increasing amounts of MIMO transmission is introduced in existing frequency bands. However, this will soon become insufficient, thereby requiring migration into spectrum at higher carrier frequencies, starting at 3.5-5 GHz, continuing to the soon available 28 GHz and 39 GHz bands and beyond, towards 60-100 GHz. For these higher bands, beamforming with massive antenna arrays, in the end with hundreds of elements, will be needed to compensate for the worsening radio propagation conditions, caused by the decreasing area of single dipole antenna elements. At these higher frequencies cost, size, power and interface constraints may prevent the use of individual digital data streams towards individual antenna elements, thereby most probably restricting solutions to so called analogue beamforming, or possibly hybrid or constrained beamforming with a few signal layers that can be used for multi-user access, over time and frequency.

At the same time the dominating multi-user access technology for 5G is expected to become some variant of Orthogonal Frequency Division Multiple access (OFDM). This access is associated with a resource grid, divided in time and frequency. A division in frequency is defined by sub-carriers and a division in time is defined by OFDM symbols. When multi layered (MIMO) transmission is used, there is one overlaid resource grid per layer, separated by spatial pre-coding.

It is noted that with analogue, hybrid or digitally constrained beamforming there is only one digital signal chain that may use pre-coding, per port. The advantage is that the signals to the many more antenna elements are then split and distributed by other analogue or digital signals towards the antenna elements, i.e. a port expansion is performed. As a consequence the analogue-to-digital/digital-to-analogue (AD/DA) conversion needs are minimized in case that would limit analogue beamforming products. In the same way, the interface requirements between base band where the MIMO pre-coding takes place and the radio Application Specific Integrated Circuit (ASIC) is also minimized. This is important since the interface capacity may constitute the bottleneck for the product. The consequence is that pure high gain analogue or interface constrained digital beamforming is restricted to scheduling of single or very few UEs, per symbol time.

This a problem since different applications have very different needs when it comes to the transmission rate. Voice traffic e.g. require <1 kbit/20 ms, whereas video download has a more or less unlimited bit rate need. Therefore, to avoid wasted capacity it is essential that the number of sub-carriers and the symbol time allows a fine enough granularity in terms of the total number of bits when combined.

Unfortunately, the Third Generation Partnership Project (3GPP) 5G standardization seems to become based partly on a re-scaling of the 4th Generation (4G) Long-Term Evolution (LTE) resource grid, which has a maximum bit rate per OFDM symbol of roughly 100000 bits, which is about 100 times larger than what is needed for voice. Later, standard developments introduce slots and mini-slots in time, however the granularity is still too coarse. In the case with pure scaling of the resource grid much more than 90% of the available resources would be wasted when applying analogue, hybrid or digitally constrained beam forming.

As a conclusion, the 3GPP 5G time-frequency granularity is adapted to digital beamforming and is too coarse to support low data rate users with good spectral efficiency, when analogue, hybrid or constrained beamforming is used at high carrier frequencies. This cannot match the granularity with e.g. WIFI present standardization ideas.

SUMMARY

It is an object to provide methods and arrangements that allows a significant amount of data to different users to be simultaneously transmitted on one single symbol in case of analogue, hybrid or constrained beamforming.

This and other objects are met by embodiments of the proposed technology.

According to a first aspect, there is provided a method for radio communication between a transmitting node and a plurality of receiving nodes. The method comprises obtaining of directions from the transmitting node to the receiving nodes and antenna gains needed for each direction of each of the receiving nodes. A beam forming solution having a high gain in the directions of a set of receiving nodes of the plurality of receiving nodes and with antenna gains adapted to the need of the link in each considered direction is obtained. User data to be transmitted to the receiving nodes is obtained in the transmitting node. The user data is overlay-coded by a code-domain overlaid code and/or a frequency-domain overlaid code, separately for each respective receiving node, forming overlaid-coded user data. The overlaid-coded user data is combined into at least one combined signal stream. One of analogue beamforming, hybrid beamforming and constrained beamforming is performed on the combined signal stream(s) according to the beam forming solution. The beamformed data is transmitted from the transmitting node to the receiving nodes.

According to a second aspect, there is provided a transmitting node for radio communication with a plurality of receiving nodes. The transmitting node is configured to obtain directions from the transmitting nodes to the receiving nodes and antenna gains needed for each direction of each of the receiving nodes. The transmitting node is configured to obtain a beam forming solution having a high gain in the directions of a set of receiving nodes of the plurality of receiving nodes and with antenna gains adapted to the need of the link in each considered direction. The transmitting node is configured to obtain user data to be transmitted to the receiving nodes. The transmitting node is configured to overlay-code the user data by a code-domain overlaid code and/or a frequency-domain overlaid code, separately for each respective receiving node, thereby forming overlaid-coded user data. The transmitting node is configured to combine the overlaid-coded user data into at least one combined signal stream. The transmitting node is configured to perform one of analogue beamforming, hybrid beamforming and constrained beamforming on the combined signal stream(s) according to the beam forming solution. The transmitting node is configured to transmit the beamformed data from the transmitting node to the receiving nodes.

According to a third aspect, there is provided a computer program comprising instructions, which when executed by at least one processor, cause the processor(s) to obtain directions from a transmitting node to a plurality of receiving nodes and antenna gains needed for each direction of each of the receiving nodes. The computer program further comprises instructions, which when executed by the processor(s), cause the processor(s) to obtain a beam forming solution having a high gain in the directions of a set of receiving nodes of the plurality of receiving nodes and with antenna gains adapted to the need of the link in each considered direction. The computer program further comprises instructions, which when executed by the processor(s), cause the processor(s) to obtain user data to be transmitted to the receiving nodes. The computer program further comprises instructions, which when executed by the processor(s), cause the processor(s) to overlay-code the user data by a code-domain overlaid code and/or a frequency-domain overlaid code, separately for each respective receiving node, into overlaid-coded user data. The computer program further comprises instructions, which when executed by the processor(s), cause the processor(s) to combine the overlaid-coded user data into at least one combined signal stream. The computer program further comprises instructions, which when executed by the processor(s), cause the processor(s) to perform analogue beam-forming, hybrid beamforming or constrained beamforming on the combined signal stream(s) according to the beam forming solution. The computer program further comprises instructions, which when executed by the processor(s), cause the processor(s) to transmit the beamformed data from the transmitting node to the receiving nodes.

According to a fourth aspect, there is provided a computer-program product comprising a computer-readable medium having stored thereon a computer program of the third aspect.

According to a fifth aspect, there is provided a carrier comprising the computer program of the third aspect, wherein the carrier is one of an electronic signal, an optical signal, an electromagnetic signal, a magnetic signal, an electric signal, a radio signal, a microwave signal, or a computer-readable storage medium.

According to a sixth aspect, there is provided a transmitting node for radio communication with a plurality of receiving nodes. The transmitting node comprises a direction-obtaining module, for obtaining directions from the transmitting node to the receiving nodes and antenna gains needed for each direction of each of the receiving nodes. The transmitting node further comprises a beam-forming planning module, for obtaining a beam forming solution having a high gain in the directions of a set of receiving nodes of the plurality of receiving nodes and with antenna gains adapted to the need of the link in each considered direction. The transmitting node further comprises a user data module, for obtaining user data to be transmitted to the receiving nodes. The transmitting node further comprises an overlay-coder, for overlay-coding the user data by a code-domain overlaid code and/or a frequency-domain overlaid code, separately for each respective receiving node, into overlaid-coded user data. The transmitting node further comprises a combiner, for combining the overlaid-coded user data into at least one combined signal stream. The transmitting node further comprises a beamformer, for performing analogue beamforming, hybrid beamforming or constrained beamforming on the combined signal stream(s) according to the beam forming solution. The transmitting node further comprises a transmitter, for transmitting the beamformed data from the transmitting node to the receiving nodes.

The proposed technology thus presents solutions that improves the situation and reduces the problem outlined above. An advantage of the proposed technology is thus a significantly improved flexibility and efficiency of the expected 3GPP 5G air interface, for high carrier frequencies, in case analogue, hybrid or constrained beamforming needs to be applied.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 9 is a schematic block diagram illustrating yet another embodiment of a transmitting node;

FIG. 11 is a schematic block diagram illustrating an embodiment of a base station;

FIG. 12 is a schematic block diagram illustrating an embodiment of a user equipment;

DETAILED DESCRIPTION

Throughout the drawings, the same reference designations are used for similar or corresponding elements.

For a better understanding of the proposed technology, it may be useful to begin with a brief overview and analysis of the technical problem.

Figure 1:
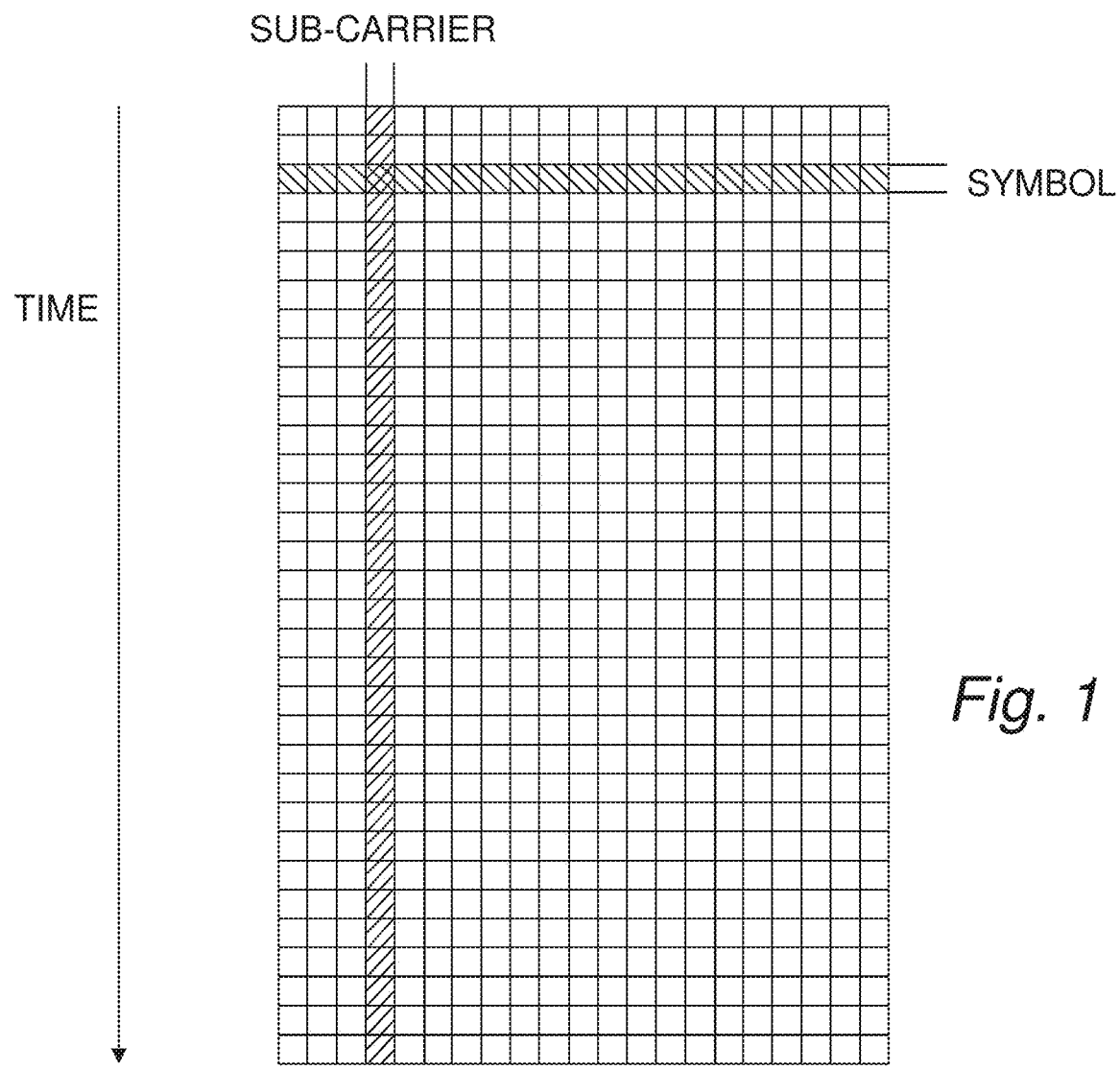
FIG. 1 is an illustration of an OFDM resource grid.

As mentioned in the background, the expected dominating multi-user access technology for 5G is some variant of OFDM. As is well known this access is associated with a resource grid, divided in time and frequency, see FIG. 1. Here, it is sufficient to consider a division in frequency defined by sub-carriers and a division in time by OFDM symbols. However, it needs to be noted that the currently evolving 3GPP new radio (NR) standard recently defined slots and associated mini-slots giving a finer resolution in time. Here, the time and frequency quantities that are used are assumed to define the finest granularity in time and frequency. In other words, a symbol is a smallest time entity used to be transmitted simultaneously. As also mentioned before, when multi layered (MIMO) transmission is used, there is one overlaid resource grid per layer, separated by spatial pre-coding.

As mentioned above, with analogue, hybrid or digitally constrained beamforming there is only one digital signal chain that may use pre-coding, per port.

The disadvantage with this limitation of the number of precoded streams from base band is that the beam steering is done by adjusting at least the phase and preferably also the amplitude weights at the antenna elements, thereby setting up a fixed beam pattern that remains valid during the whole symbol (time). Note that the times where the beam is valid can, in principle, be any system time for which a standard allows so, therefore the technology presented here is not limited to the concept of symbol time. If this beam is narrow, which it is has to be to counter the propagation effects at high carrier frequencies, this means that the transmitted signal energy can only be directed in one direction, per symbol time. Since also pre-coded UEs using additional layers would be attenuated by this beam unless they are aligned to it, the consequence is, as mentioned above, that pure high gain analogue or interface constrained digital beam forming is restricted to scheduling of single, or at least very few, UEs, per symbol time. This causes the above mentioned problems.

Figure 2:
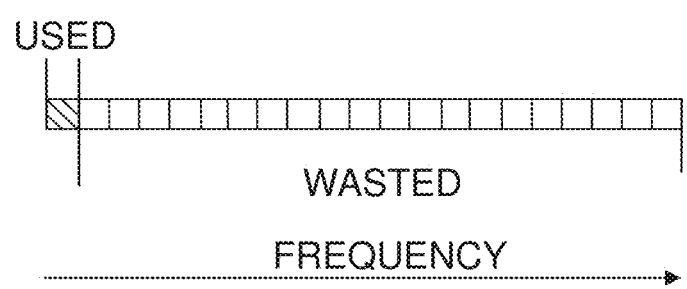
FIG. 2 is an illustration of capacity waste with analogue beamforming.

Unfortunately, the 3GPP 5G standardization seems to become based on a re-scaling of the 4G LTE resource grid, which has a maximum bit rate per OFDM symbol of roughly 100000 bits, which is about 100 times larger than what is needed for voice. A large part of the available resources would be wasted when applying analogue, hybrid or digitally constrained beam forming, see FIG. 2.

Beamforming and MIMO transmission is a mature subject today. In Appendix A, there is presented a summary of the basics. For a detailed treatment, any textbook on digital communications could be consulted.

The general techniques of beamforming are very flexible and this flexibility opens up for finding beam forming solutions having a high gain in a certain direction or certain directions and at the same time with antenna gains adapted to different kinds of needs or requests. A combination of such a flexibility with an overlay coding will improve the overall situation considerably.

Figure 3A:
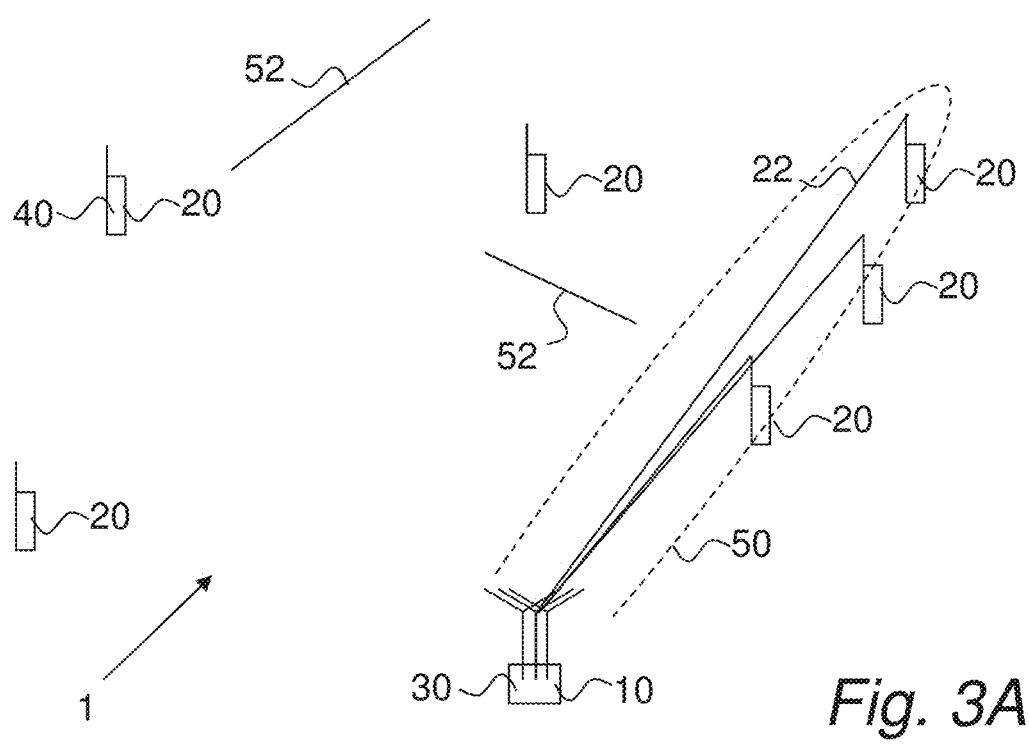
FIGS. 3A-B are schematic illustrations of a radio communication system utilizing beamforming.

In FIG. 3A, a schematic illustration of a radio communication system 1 is illustrated. A transmitting node 30, in this particular example a base station 10, communicates with a plurality of receiving nodes 40, in this particular example user equipments 20. Obstacles 52 for the radio signals may be present within the area. Each user equipment 20 is located in a certain radio direction 22 with reference to the base station 10. In the right part of the figure, three user equipments 20 are present, which have radio directions 22 that are almost the same. A beamformed radio signal 50, as illustrated by the broken line, can be formed by the base station 10. The beamformed radio signal 50 covers all the three user equipments 20 and could therefore be used for communication with any of them. By making use of an overlay coding, signalling to the different user equipments 20 can be distinguished, and thus all three user equipments 20 can communicate with the base station 10 simultaneously.

Figure 3B:
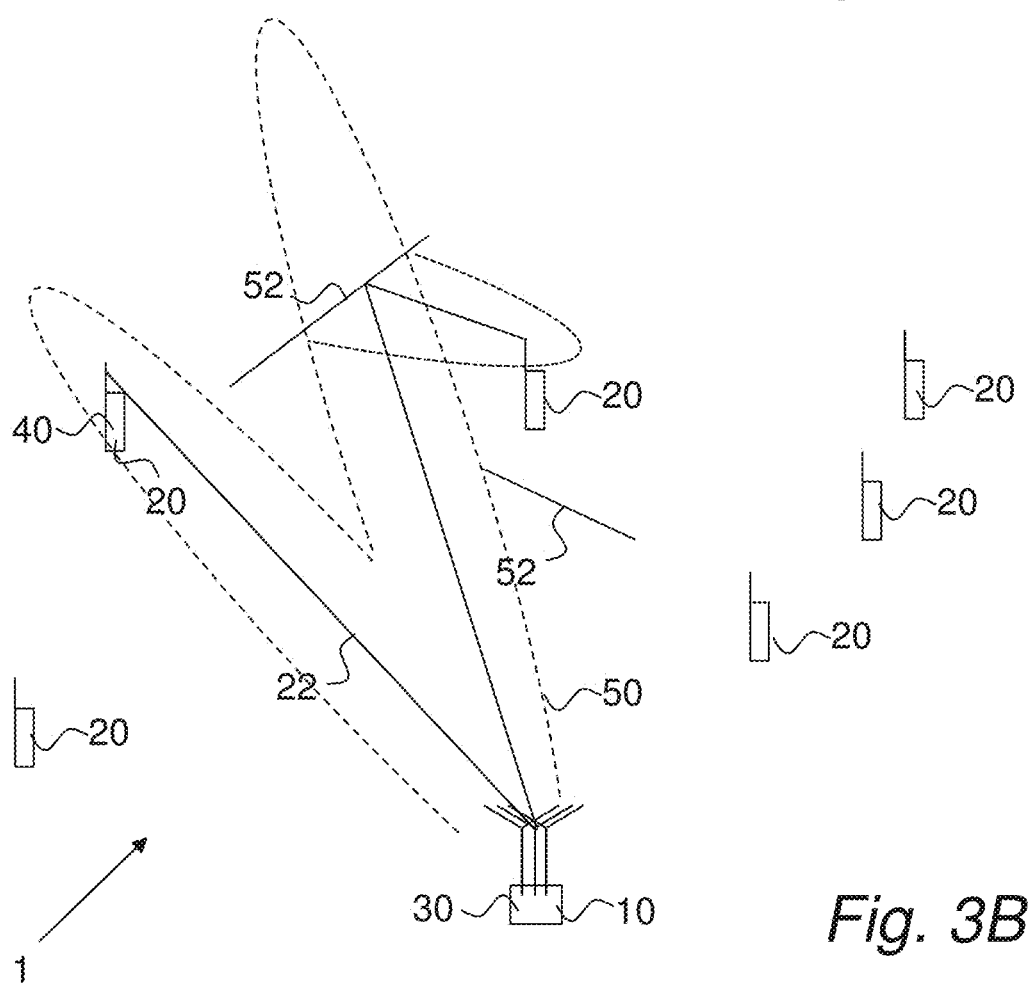

In FIG. 3B, another beam forming solution is used, giving a beamformed radio signal 50 having two main lobes. Each lobe reaches a user equipment 20, if necessary by a reflection in an obstacle 52. The beam forming solution thereby provides means to cover two user equipments 20 at the same time. Also here, by making use of an overlay coding, signalling to the different user equipments 20 can be distinguished, and thus both user equipments 20 can communicate with the base station 10 simultaneously.

Figure 4:
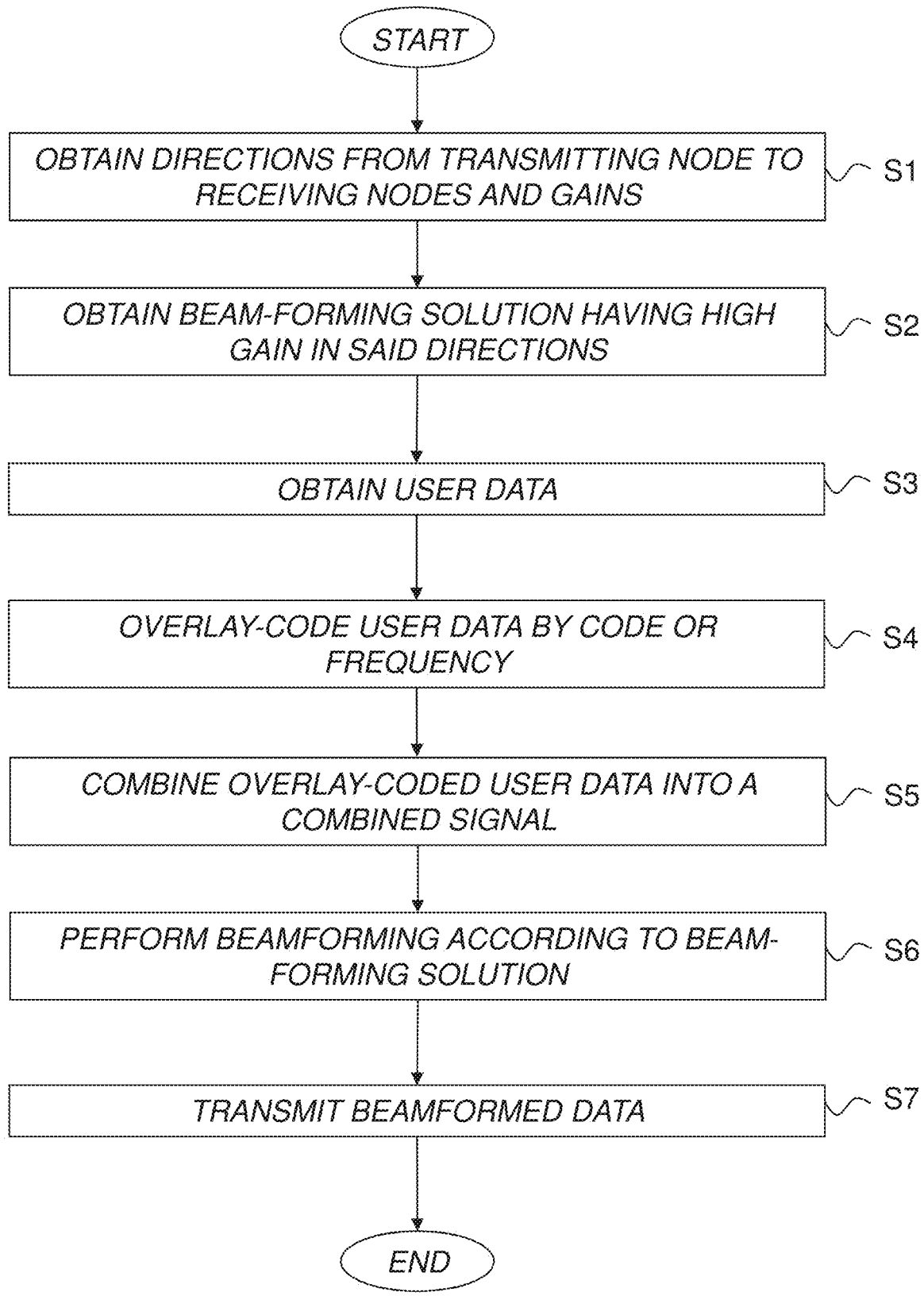
FIG. 4 is a flow diagram of steps of an embodiment of a method for radio communication between a transmitting node and a plurality of receiving nodes.

FIG. 4 is a schematic flow diagram illustrating steps of an embodiment of a method for radio communication between a transmitting node and a plurality of receiving nodes. In step S1, directions from the transmitting node to the receiving nodes and antenna gains needed for each direction of each of the receiving nodes are obtained. Such procedures are, as such, known in prior art and follows preferably standard procedures. These procedures can be performed in the transmitting node, in the receiving nodes, partly in both nodes and/or at least to a part in another node in communicational connection with the transmitting node. In step S2, a beam forming solution is obtained having a high gain in the directions of a set of receiving nodes of the plurality of receiving nodes and with antenna gains adapted to the need of the link in each considered direction. Such beamforming routines are, as such, also known in prior art. These procedures can be performed in the transmitting node and/or at least to a part in another node in communicational connection with the transmitting node. In step S3, user data to be transmitted to the receiving nodes are obtaining in the transmitting node.

In step S4, the user data is overlay-coded by a code-domain overlaid code and/or a frequency-domain overlaid code. This overlay-coding is performed separately for each respective receiving node. The overlay-coding results in overlaid-coded user data. The overlay-coding can be performed in analogy with Frequency-Division Multiple Access (FDMA) and/or Code Division Multiple Access (CDMA) methodologies. This will be discussed more further below. In step S5, the overlaid-coded user data is combined into at least one combined signal stream. This combined signal stream or combined signal streams thus comprises signalling intended for more than receiving node and arranged in such a way that it can be distinguished from each other. In step S6, analogue beamforming, hybrid beamforming or constrained beamforming is performed on the combined signal stream(s) according to the beam forming solution obtained in step S2. In step S7, the beamformed data is transmitted from the transmitting node to the receiving nodes.

The problems with low utilization of the radio resources are thus at least to a part solved by a collection of solutions, where new multi user analogue beamforming techniques are combined with overlay-coding, e.g. by CDMA or FDMA encoding of multiple user data on a single symbol, typically an OFDM symbol. The invention uses existing link adaptation, receiver and antenna functionality to derive the direction(s) to the user, typically expressed in terms of azimuth or elevation angle(s). Feedback or reciprocity based methods may be used for this, see appendix A. The antenna gain(s) needed for each direction of each user are also derived. Receiver and link adaptation functionality may be used for this purpose. Note that different users may share a specific azimuth and elevation direction, c.f. FIG. 3A.

According to the here presented technology, a beam forming solution is computed that aims at providing an antenna pattern from the antenna array that has a high gain in the directions of all considered UEs. It is also an object of the present technique to provide methods and arrangements that adjust the antenna gain to the link requirements, simultaneously for multiple users on a single symbol in case of analogue, hybrid or constrained beamforming. Consequently, the beam forming solution also aims at providing antenna gains adapted to the need of the link in each considered direction. Note that in case multiple users share the same direction, then the maximum of the antenna gain over the users needs to be determined.

The here presented approach further encodes the user data to be transmitted for each user, typically either by CDMA or FDMA principles. Note that in case several users share the same direction, they thereby become possible to separate in the frequency and/or code domain. Historically the multi-access methods used in cellular systems started with FDMA, in the first analogue generation. This means that users are distinguished by being allocated to different frequencies. The next step was CDMA, where users are distinguished by codes, taken from a pre-defined set. A short summary of some aspects of CDMA is given in Appendix B.

In one embodiment, the overlay-coding is performed for one symbol at a time. The symbol is here considered to be a smallest time entity used to be transmitted simultaneously. Note however, nothing does prevent the above presented aspects from being applied on aggregated symbols, or only on parts of the frequency spectrum.

The first digital communication systems used time division multiple access (TDMA), distinguishing users by allocation to different time slots, while all users were using the same frequency band. However, if the above described overlay-coding techniques are applied for each symbol, such time division multiple access is not utilized in the present approach. It is however applied in the sense that different users can be accessed when being scheduled to different symbol times.

The combined signal streams are sent to the radio from baseband, split, digital-to-analogue (DA) converted and sent to the antenna array for transmission. The beam formed analogue antenna pattern is created for the symbol time in question by application of beamforming weights, representative of the above computed antenna pattern to the antenna elements. In practice phase shifting and amplitude multiplication may be applied, or performed jointly as a complex multiplication. Finally, the beamformed data is transmitted.

Note that this approach is still somewhat wasteful with power since the data for all users are sent also in the directions of all other users scheduled on the symbol in question. However, it represents a large improvement as compared to prior art where only a single or few users may be handled per symbol.

The technology here is described mainly focusing on one spatial layer. However it can be applied also on multiple layers, also by additional combining with overlay-coding. In other words, in one embodiment, the combined signal stream(s) comprises more than one layer. The layer thereby represents a spatial pre-coding entity. The overlay-coding of the user data is then performed separately for each layer.

The beam pattern calculation needs input. This input includes at least beam directions per user u, $\alpha_{u,i}$ (azimuths), and $\varepsilon_{u,i}$ (elevations), $i=1, \ldots, I_u$, $u=1, \ldots, U$.

The beam pattern calculation preferably also needs required antenna gain for each direction, $G_{u,i}$, $i=1, \ldots, I_u$, $u=1, \ldots, U$.

The requirements above can then be used to set up an optimization problem for computation of the beam forming weights:

$$w = (w_{1,1} \ldots w_{N,M})^H. \quad (1)$$

The first index refers to azimuth while the second index refers to elevation.

In order to describe one embodiment of this problem, the beam directions and antenna gain requirements are formulated in terms of a desired antenna gain pattern $G_d(\alpha, \varepsilon)$ that then fulfills:

$$G_d(\alpha, \varepsilon) \geq G_{u,i}, \ \alpha_{u,i} - \Delta \leq \alpha \leq \alpha_{u,i} + \Delta, \ \varepsilon_{u,i} - \Delta \leq \varepsilon \leq \varepsilon_{u,i} + \Delta, \ u=1, \ldots, U, \ i=1, \ldots, I_u. \quad (2)$$

where $\Delta$ is a beam width parameter and where a and e are the azimuth and elevation angles. One possible criterion which has the advantage of always being feasible is then the unconstrained formulation:

$$\hat{w} = \underset{w}{\operatorname{argmin}} |G(w, \alpha, \varepsilon) - G(\alpha, \varepsilon)|^2. \quad (3)$$

This is just one embodiment, other criteria are possible as well. The function $G(w, \alpha, \varepsilon)$ depends on the antenna geometry, see any textbook on beamforming. It is noted that the solution to the problem may provide good and bad solutions, depending on the required beam shape and the antenna geometry. The beam pattern calculation is, as such, well known in prior art. It is included here to give a self-contained and general description of the invention.

The essential feature can be expressed as determination of antenna element weights for analogue beamforming. The determination is dependent on detected beam directions and computed required antenna gains, for meeting link budget requirements for the detected beam directions, for at least two users per symbol, and per spatial layer.

Figure 5:
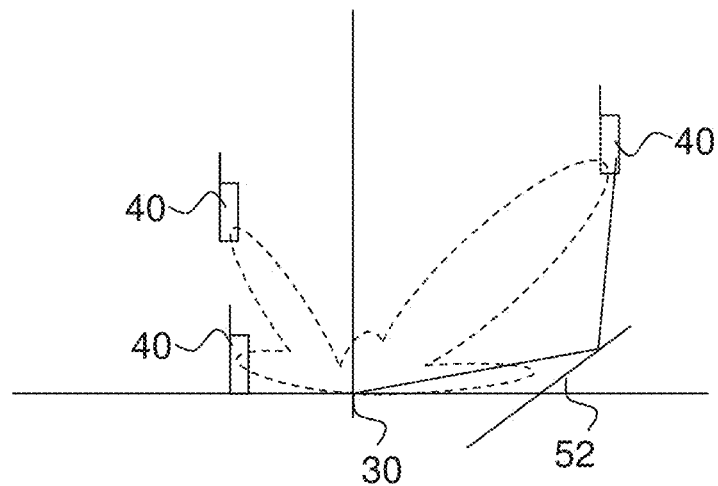
FIG. 5 is an example analogue antenna gain pattern.

FIG. 5 illustrates an example analogue antenna gain pattern for analogue multiuser access on one symbol. Note that the data of all users are radiated by this antenna pattern, i.e. there is a loss as compared to digital beamforming. Note also that in general several users may also share the same direction.

The user data mapping is made assuming that at least two users are to be allocated on the resources corresponding to one single symbol on the resource grid.

The frequency allocation, if used as overlay-coding is based on similar principles as in LTE. As can be seen users are allocated to different sets of sub-carriers.

Figure 6A:
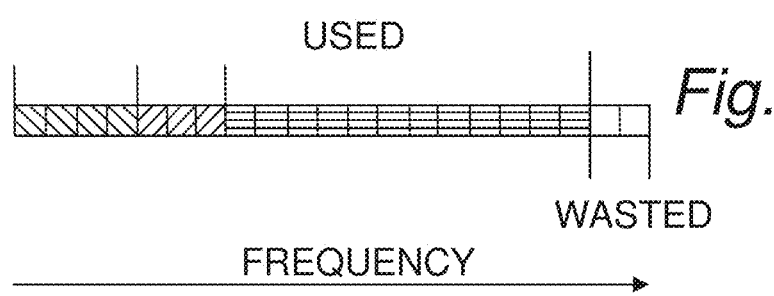
FIG. 6A illustrates utilization in a frequency domain of radio resources for frequency allocation for analogue beamforming.

It is stressed that the time signal, corresponding to the symbol, is transmitted in the directions of all users. This is not optimal, but a big gain as compared to the situation of FIG. 2. FIG. 6A illustrates the utilization of resources with overlay-coding by frequency allocation for analogue beamforming. In order for the user to be able to retrieve the transmitted data in the UE, a similar control signaling as in e.g. LTE is needed, per direction of a user. The base station needs to inform the UE about a number of things in order for the UE to be able to recover the transmitted data. This signaling at least comprises information on the sub-carriers allocated to each UE and the modulation and coding scheme (MCS) applied for each user. Thus, in an embodiment utilizing frequency-domain overlaid code, frequency allocation of user data and MCS is performed. The allocation is performed user. Finally note that the users may share a single direction.

Figure 6B:
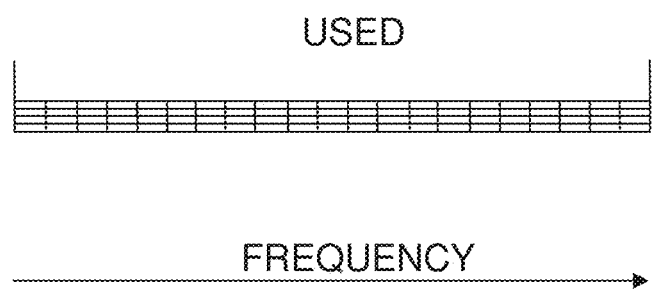
FIG. 6B illustrates utilization of radio resources in a frequency domain for code allocation for analogue beamforming.

In another embodiment, a code-domain overlaid code is utilized, i.e. code allocation is used. In this embodiment users are allocated a code, from a set of user codes $\{c_j\}_{j=1}^J$. The data of each user is encoded and spread over the symbol as shown e.g. in FIG. 6B. The data of different users can then be superimposed into a joint signal, modulated and transmitted. Note that the waste may be similar to the one of FIG. 6A, however here it may be represented by use of unnecessary power.

It is stressed that the time signal corresponding to the symbol is transmitted in the directions of all users. This is not optimal, but once again a big gain as compared to the situation of FIG. 2. Note that the users may share a single direction. Thus, in an embodiment utilizing code-domain overlaid code, code allocation is performed. The allocation is performed per user and the users are superimposed. Users may share the same directional properties.

The base station needs to inform the UE about a number of things in order for the UE to be able to recover the transmitted data. In case of code allocation, the definition of the coding scheme to use has to be defined. In addition the control signaling needs to inform each UE of the code it is to use to retrieve the coded information.

In order to exercise the technology presented here, the direction to UEs served by the cell are determined, preferably to all UEs served by the cell. This can e.g. be derived from UL measurements based on reciprocity. In other words, the obtaining of the directions comprises deducing the directions in the transmitting node. These measurements could preferably be based on so called sounding signals sent by the UE. In other words, in one embodiment, the deducing of the directions comprises estimation of channel coefficients based on pilot transmissions from the receiving nodes.

Another alternative is to base the directional determination on information provided from another node. In other words, in one embodiment, the obtaining of the directions comprises receiving information of the directions in the transmitting node. In a particular embodiment, the information of the directions is provided by the receiving nodes. Examples of information that could be used for deducing of the directions are by channel state information feedback, i.e. channel quality indication, rank indication and similar. In case beams are followed directional information could be derived from such tracking functionality as well.

In one embodiment, the obtaining of the beam forming solution comprises computing of the beam forming solution in the transmitting node. In this case, the transmitting node is autonomously deciding the beamforming.

The actual computing of the beam forming solution may however also performed at different places in a communication system. As discussed further below, even cloud solutions may be feasible. In such an embodiment, the obtaining of the beam forming solution comprises receiving of the beam forming solution from another party, e.g. another node in the communication system.

With a few active receiving nodes present in the coverage area of the transmitting node, it might be possible to arrange for a simultaneous transmission to all these active receiving nodes. However, if the number of receiving nodes is too large or if the total requested transmission rate exceeds the available resources, a selection of a set of receiving nodes to be served for a particular symbol has to be performed.

In one embodiment, the set of receiving nodes of the plurality of receiving nodes is selected to comprise receiving nodes having the directions relative to the transmission node that are within a beam width of each other. This means that receiving nodes in approximately the direction with respect to the transmitting node are collected in the same set. One way to perform such selection is to sort the receiving nodes or users according to their directional information in azimuth and elevation, in bins whose size depend on the available beam width. In case more than one user is comprised in a bin, these users are selected as a set and the coding principles described here above are applied.

As indicated above, also beamforming solutions having several high-gain directions may be utilized. This means that receiving nodes of more than one bin can be included in a same set. However, it becomes more and more difficult to achieve good radio conditions for increasing number of high-gain directions, so preferably, the number of different direction or bins are kept at a low number. In other words, the set of receiving nodes of the plurality of receiving nodes is selected to reduce a number of the high gain directions for each symbol.

For a next symbol, a new set of receiving nodes can be used.

Two detailed embodiments are to be discussed in the following. In a first particular embodiment, analogue and hybrid beamforming is used for multiple users in a single direction. The case when a single directional beam pattern is computed, is most probably one of the most preferred solutions. It applies to the case where there are a number of users sharing the same elevation and azimuth angle. Then the multiple users may be encoded by frequency division of the OFDM signal between the users. Alternatively, they may be encoded with code division techniques and superimposed over the whole frequency band. It is also possible to combine frequency division and code division. In case of analogue beamforming two digital data streams, one for each polarization direction, are then sent from baseband to the radio. In the radio, beam forming is applied in the direction of the users sharing the same azimuth and elevation. Note that the antenna gain need to be set so that the user requiring the highest gain can be reached. The antenna gain selection is therefore wasteful for some users that receive more power than they need. To some extent that may be mitigated by a proper selection of the modulation and coding scheme for each user on the particular OFDM symbol.

In a second particular embodiment, constrained beamforming with multiple frequency separated directions is used. Also this case is believed to one of the most preferred solutions. This follows when the frequency band is divided in sub-bands. The idea is that each frequency sub-band is used to define a single direction in azimuth and elevation, or two directions if polarization layers are considered. Using additional frequency and/or code division coding within each sub-band, it is then possible to encode a number of users that share the same frequency sub-band direction in the base band. The result would in this case be two digital data streams per frequency sub-band. The digital data streams for all frequency sub-bands are then sent to the radio. Note that the number of data streams is normally much smaller than the total number of antenna elements interfacing the radio. In the radio, the data of the frequency sub-bands are separated by digital filtering. The result will be two digital data streams assuming both polarization directions per frequency sub-band. Digital or analogue beamforming is then applied, to generate the correct direction for each frequency sub-band after which the transmission is performed. Note that also here multiple user may be accessed in the same direction.

In the examples described here above, a base station has been used as a model example of a transmitting node, and user equipments have been used as model examples of receiving nodes. This downlink transmission is also a very probable scenario. In other words, in one embodiment, the transmitting node is a base station and the receiving nodes are user equipments, whereby the transmitting of the beamformed data is performed in a downlink direction.

However, the principles may also be applied e.g. in an uplink scenario. In the uplink the invention can be applied e.g. in case analogue beamforming is applied in so called multi-connectivity. This means that the UE communicates with more than 1 base station at the same time. In this case the most common case is that the base stations are represented by different directions. Consider FIG. 5 again. In this scenario, the transmitting node 30, placed in the origin, is a UE, and the receiving nodes 40 are to be interpreted as base stations. In the case with analogue beamforming the information to a base station is transmitted to all base stations. The information can, according to the invention, be separated in the frequency or code domains. So in this case the UE performs the coding. In other words, in one embodiment, the transmitting node is a user equipment and the receiving nodes are base stations, whereby the transmitting of the beamformed data is performed in an uplink direction.

The proposed technology may be applied to a user terminal, which may be a wired or wireless device.

As used herein, the non-limiting terms "User Equipment (UE)", "station (STA)" and "wireless communication device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the term "wired device" may refer to any device configured or prepared for wired connection to a network. In particular, the wired device may be at least some of the above devices, with or without radio communication capability, when configured for wired connection.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs, or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a transmitting node for radio communication with a plurality of receiving nodes. The transmitting node is configured to obtain directions from the transmitting node to the receiving nodes and antenna gains needed for each direction of each of the receiving nodes. The transmitting node is further configured to obtain a beam forming solution having a high gain in the directions of a set of receiving nodes of the plurality of receiving nodes and with antenna gains adapted to the need of the link in each considered direction. The transmitting node is further configured to obtain user data to be transmitted to the receiving nodes. The transmitting node is further configured to overlay-code the user data by at least one of a code-domain overlaid code and a frequency-domain overlaid code, separately for each respective receiving node, into overlaid-coded user data. The transmitting node is also configured to combine the overlaid-coded user data into at least one combined signal stream. The transmitting node is further configured to perform analogue beamforming, hybrid beamforming or constrained beamforming on the combined signal stream(s) according to the beam forming solution. The transmitting node is further configured to transmit the beamformed data from the transmitting node to the receiving nodes.

In one embodiment, the transmitting node is further configured to perform the overlaid-coding for one symbol at a time. The symbol is defined as a smallest time entity used to be transmitted simultaneously.

In one embodiment, the combined signal stream(s) comprises more than one layer. The layer represents a spatial pre-coding entity. The transmitting node is further configured to perform the overlay-coding of the user data separately for each layer.

In one embodiment, the transmitting node is further configured to receive information of the directions.

In a further embodiment, the information of the directions is provided by the receiving nodes.

In one embodiment, the transmitting node is further configured to deduce the directions in the transmitting node.

In a further embodiment, the transmitting node is further configured to estimate channel coefficients based on pilot transmissions from the receiving nodes.

In one embodiment, the transmitting node is further configured to receive the beam forming solution.

In one embodiment, the transmitting node is further configured to compute the beam forming solution.

In one embodiment, the transmitting node is further configured to select the set of receiving nodes of the plurality of receiving nodes to comprise receiving nodes having the directions relative to the transmission node that are within a beam width of each other.

In one embodiment, the transmitting node is further configured to select the set of receiving nodes of the plurality of receiving nodes to reduce a number of the high gain directions for each symbol.

Figure 7:
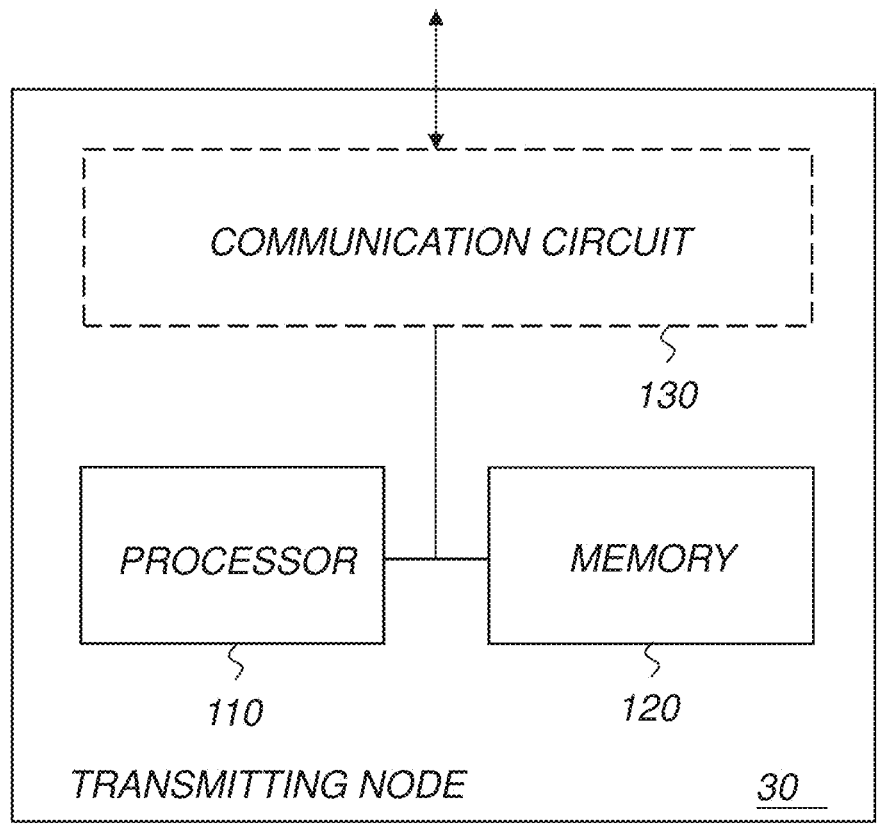
FIG. 7 is a schematic block diagram illustrating an embodiment of a transmitting node.

FIG. 7 is a schematic block diagram illustrating an example of a transmitting node 30, based on a processor-memory implementation according to an embodiment. In this particular example, the transmitting node 30 comprises a processor 110 and a memory 120, the memory 120 comprising instructions executable by the processor 110, whereby the processor is operative to overlay-code the user data, to combine the overlaid-coded user data into the at least one combined signal stream, and to perform the analogue beamforming, hybrid beamforming or constrained beamforming on the combined signal stream(s).

Optionally, the transmitting node 30 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s). In one embodiment, the communication circuit 130 is configured to obtain the user data to be transmitted to the receiving nodes, and to transmit the beamformed data from the transmitting node to the receiving nodes.

Figure 8:
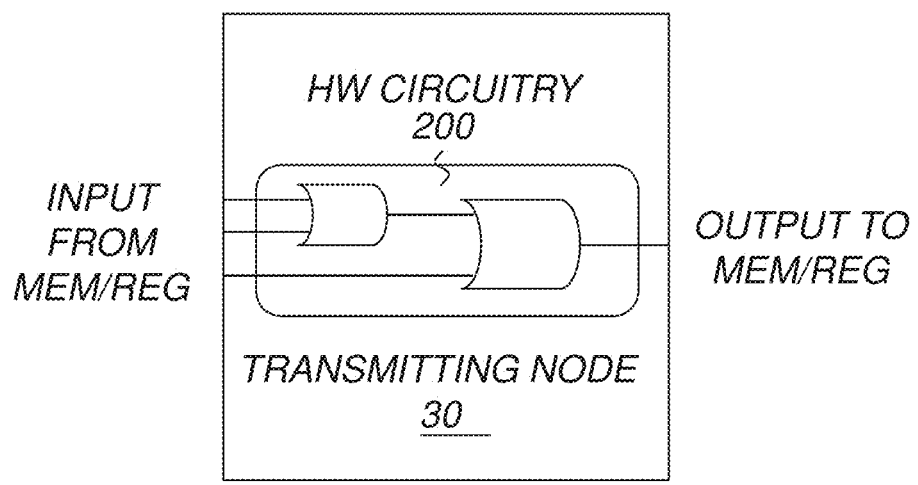
FIG. 8 is a schematic block diagram illustrating another embodiment of a transmitting node.

FIG. 8 is a schematic block diagram illustrating another example of a transmitting node 30, based on a hardware circuitry implementation according to an embodiment. Particular examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

FIG. 9 is a schematic block diagram illustrating yet another example of a transmitting node 30, based on combination of both processor(s) 310-1, 310-2 and hardware circuitry 330-1, 330-2 in connection with suitable memory unit(s) 320. The transmitting node 30 comprises one or more processors 310-1, 310-2, memory 320 including storage for software and data, and one or more units of hardware circuitry 330-1, 330-2 such as ASICs and/or FPGAs. The overall functionality is thus partitioned between programmed software (SW) for execution on one or more processors 310-1, 310-2, and one or more pre-configured or possibly reconfigurable hardware circuits 330-1, 330-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 10:
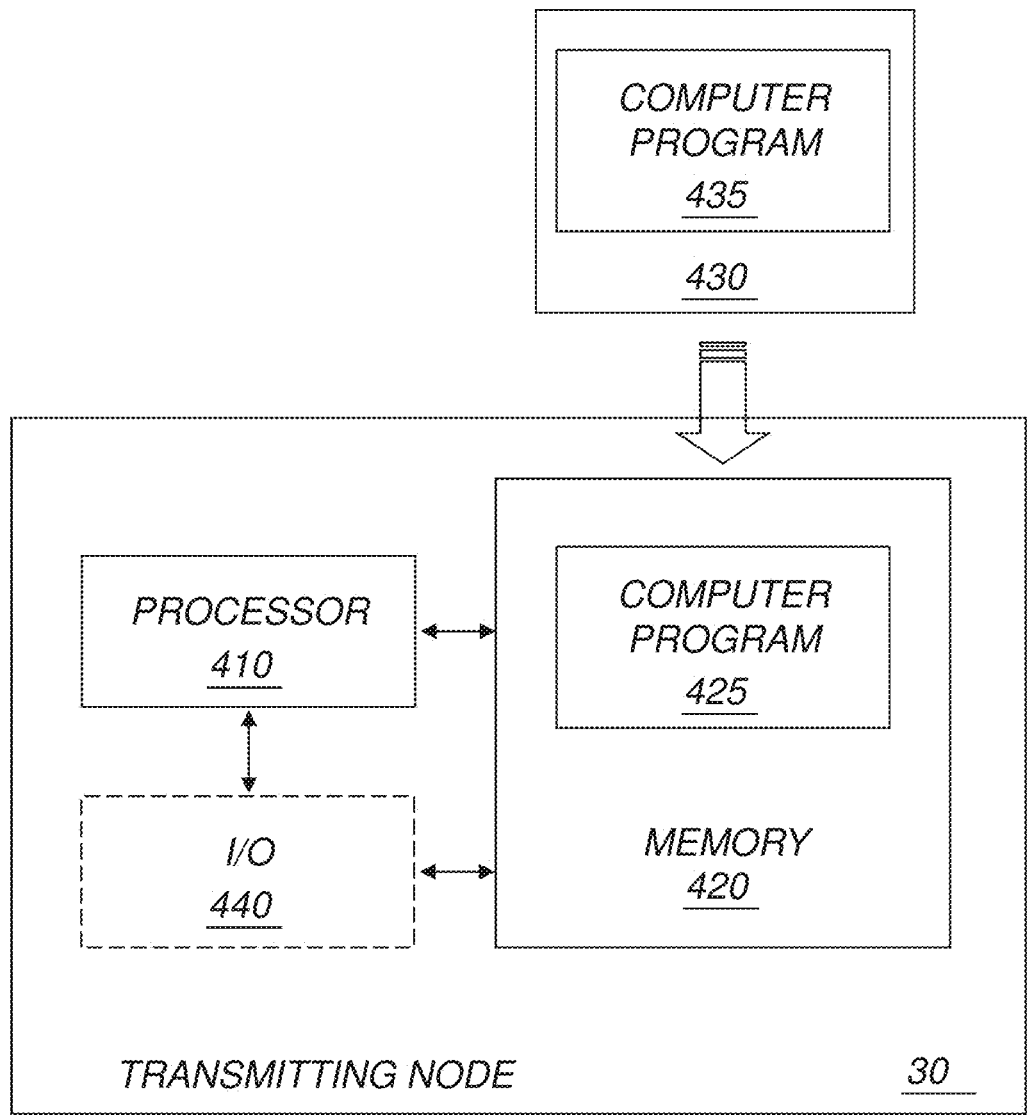
FIG. 10 is a schematic diagram illustrating an embodiment of a computer-implementation of a transmitting node.

FIG. 10 is a schematic diagram illustrating an example of a computer-implementation of a transmitting node 30 according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, the computer program 425; 435 comprises instructions, which when executed by at least one processor 410, cause the processor(s) 410 to obtain directions from a transmitting node to a plurality of receiving nodes and antenna gains needed for each direction of each of the receiving nodes, to obtain a beam forming solution having a high gain in the directions of a set of receiving nodes of the plurality of receiving nodes and with antenna gains adapted to the need of the link in each considered direction, to obtain user data to be transmitted to the receiving nodes, to overlay-code the user data by at least one of a code-domain overlaid code and a frequency-domain overlaid code, separately for each respective receiving node, into overlaid-coded user data, to combine the overlaid-coded user data into at least one combined signal stream, to perform analogue beamforming, hybrid beamforming or constrained beamforming on the combined signal stream(s) according to the beam forming solution, and to transmit the beamformed data from the transmitting node to the receiving nodes.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

FIG. 11 is a schematic block diagram illustrating an example of a network device, in this particular embodiment a base station 10, comprising or constituting the transmitting node 30 according to any of the embodiments. In other words, in one embodiment, the transmitting node is a base station, whereby the transmitting node is further configured to transmit the beamformed data in a downlink direction.

The network device may be any suitable network device in the wireless communication system, or a network device in connection with the wireless communication system. By way of example, the network device may be a suitable network node such a base station or an access point. However, the network device may alternatively be a cloud-implemented network device.

According to another aspect, as illustrated in FIG. 12, there is provided a communication unit, in this particular embodiment a UE 20, in a wireless communication system, wherein the communication unit comprises or constitutes the transmitting node 30 as described herein. The communication unit may be any suitable communication unit in the wireless communication system. By way of example, the communication unit may be a wireless communication device such as a UE, STA or similar end-user device. In other words, in one embodiment, the transmitting node is a user equipment, whereby transmitting node is further configured to transmit the beamformed data in an uplink direction.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 13:
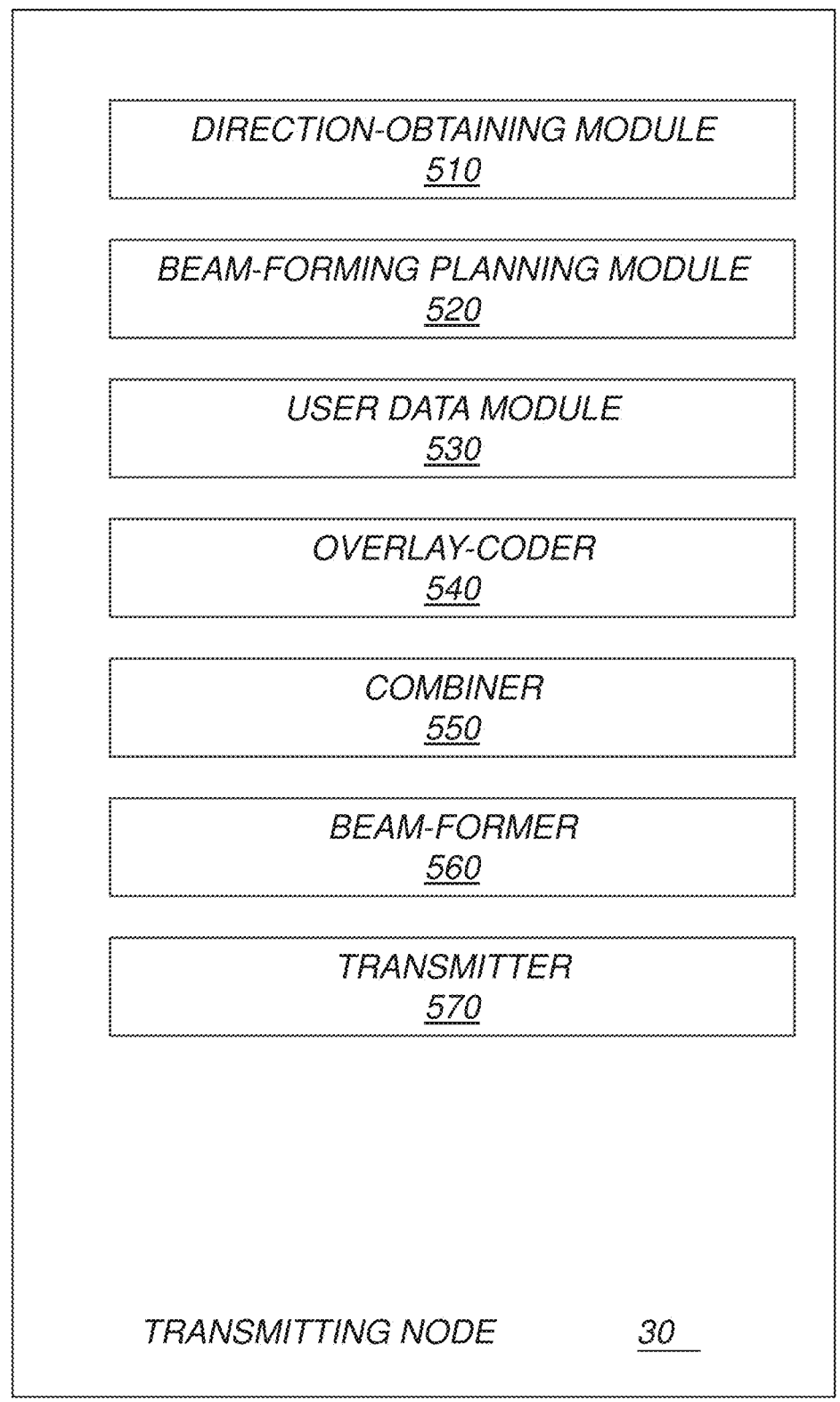
FIG. 13 is a schematic diagram illustrating an embodiment of a transmitting node.

FIG. 13 is a schematic diagram illustrating an embodiment of a transmitting node 30 for radio communication with a plurality of receiving nodes. The transmitting node 30 comprises a direction-obtaining module 510, for obtaining directions from the transmitting node to the receiving nodes and antenna gains needed for each direction of each of the receiving nodes. The transmitting node 30 further comprises a beam-forming planning module 520, for obtaining a beam forming solution having a high gain in the directions of a set of receiving nodes of the plurality of receiving nodes and with antenna gains adapted to the need of the link in each considered direction. The transmitting node 30 further comprises a user data module 530, for obtaining user data to be transmitted to the receiving nodes. The transmitting node 30 further comprises an overlay-coder 540, for overlay-coding the user data by a code-domain overlaid code and/or a frequency-domain overlaid code, separately for each respective receiving node, into overlaid-coded user data. The transmitting node 30 further comprises a combiner 550, for combining the overlaid-coded user data into at least one combined signal stream. The transmitting node 30 further comprises a beamformer 560, for performing analogue beamforming, hybrid beamforming or constrained beamforming on the combined signal stream(s) according to the beam forming solution. The transmitting node 30 further comprises a transmitter 570, for transmitting the beamformed data from the transmitting node to the receiving nodes.

Alternatively it is possible to realize the module(s) in FIG. 13 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 14:
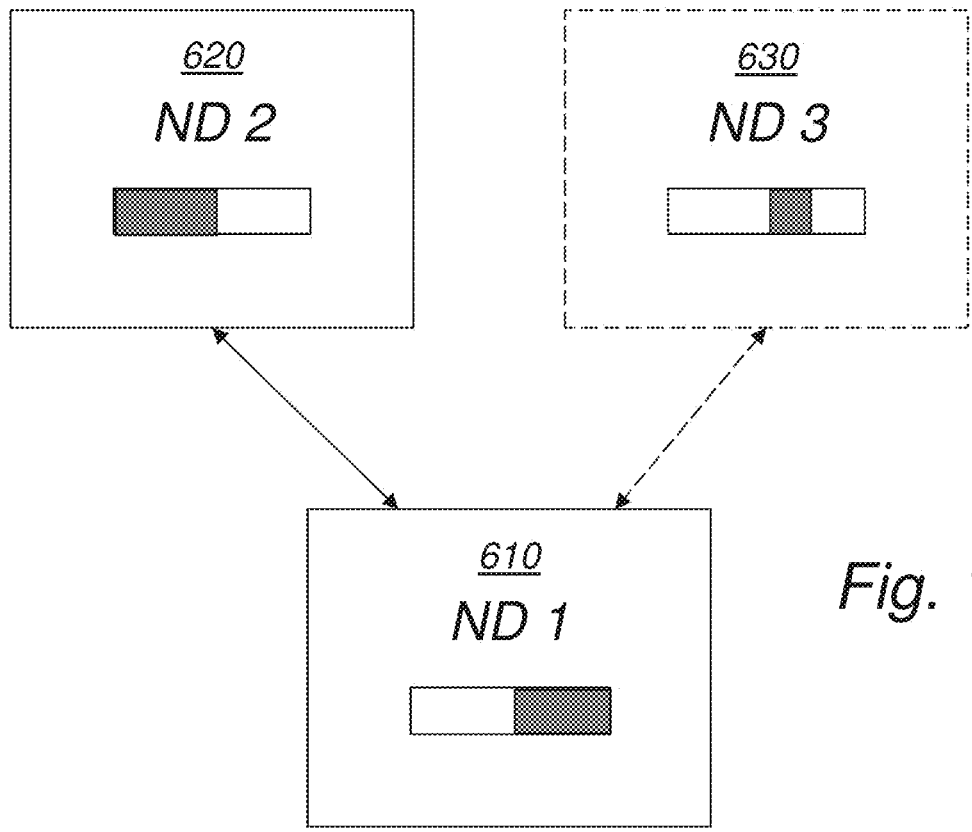
FIG. 14 is a schematic diagram illustrating partitioned functionality.

FIG. 14 is a schematic diagram illustrating an example of how functionality can be distributed or partitioned between different network devices in a general case. In this example, there are at least two individual, but interconnected network devices, ND1 and ND2, with reference numerals 610 and 620, respectively, which may have different functionalities, or parts of the same functionality, partitioned between the network devices 610 and 620. There may be additional network devices, such as ND3, with reference numeral 630, being part of such a distributed implementation. The network devices 610-630 may be part of the same wireless communication system, or one or more of the network devices may be so-called cloud-based network devices located outside of the wireless communication system.

Figure 15:
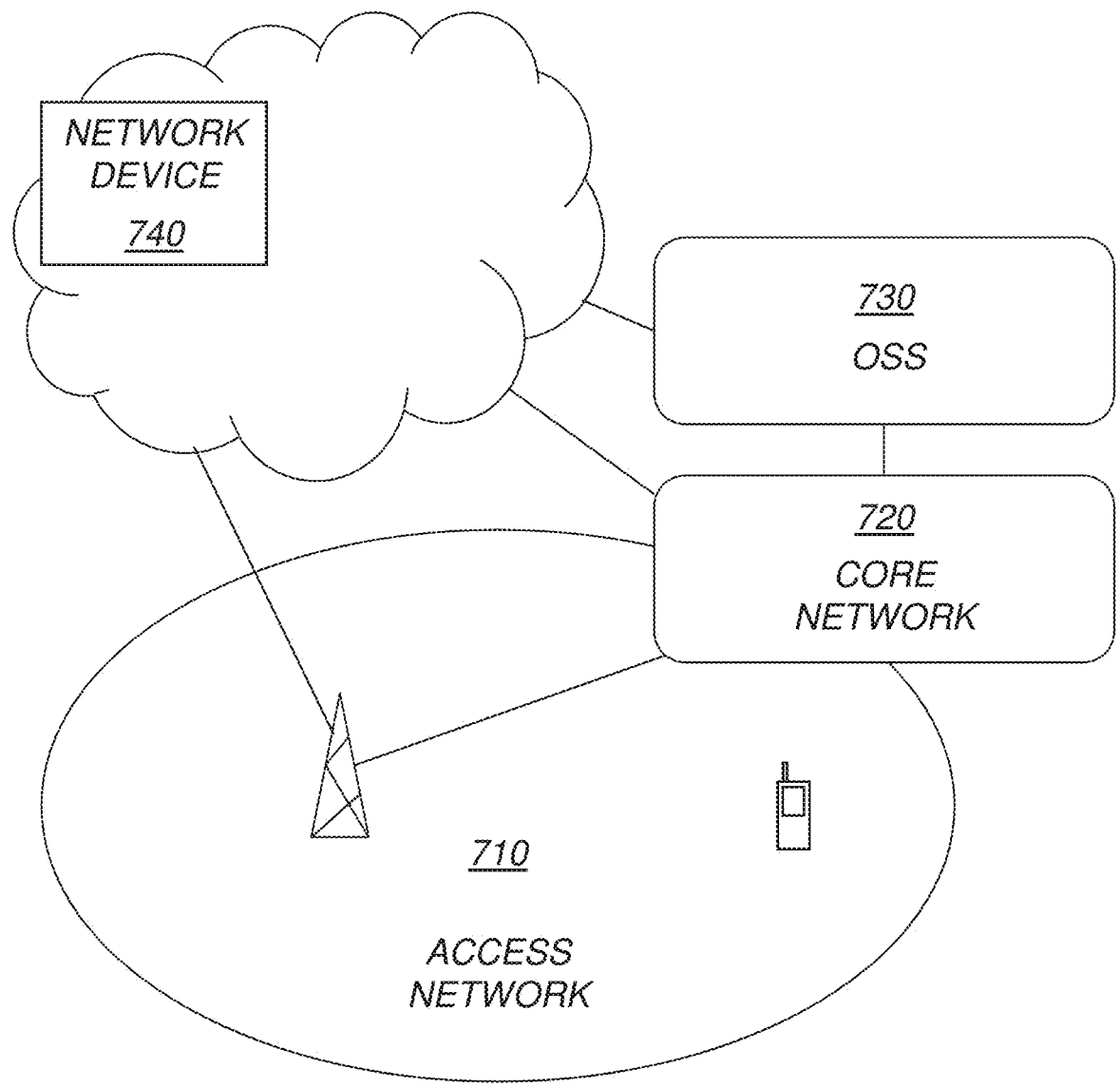
FIG. 15 is a schematic diagram illustrating an example of a wireless communication system.

FIG. 15 is a schematic diagram illustrating an example of a wireless communication system, including an access network 710 and/or a core network 720 and/or an Operations and Support System (OSS), 730 in cooperation with one or more cloud-based network devices 740. Functionality relevant for the access network 710 and/or the core network 720 and/or the OSS system 730 may be at least partially implemented for execution in a cloud-based network device 740, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

APPENDIX A

Here some technical general background of beamforming and MIMO is given.

Figure 16:
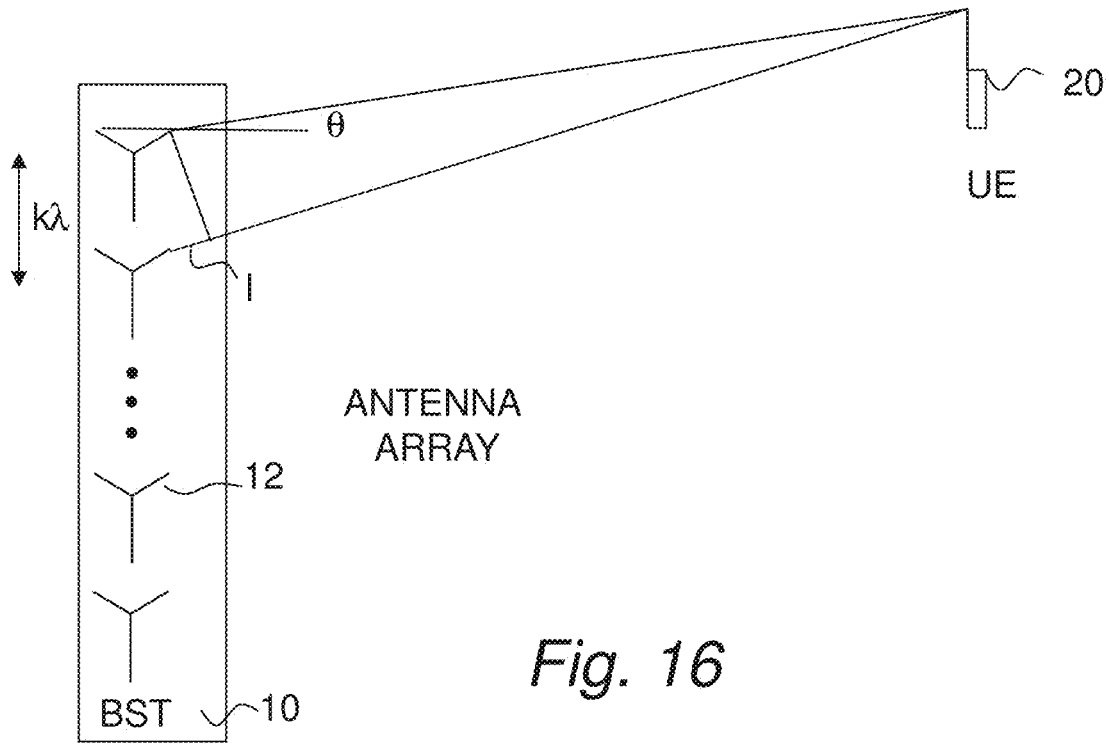
FIG. 16 is an illustration of an antenna array used for beamforming.

To explain the beamforming concept, a transmitting base station 10 and a receiving UE 20 are used as a model system. Consider FIG. 16 which shows an idealized one-dimensional beamforming case. In case it is assumed that the UE is located far away from an antenna array 12 of the base station 10 it follows that the difference in travel distance 1 from the base station 10 to the UE 20, between adjacent antenna elements, is:

$$l = k\lambda \sin(\theta), \tag{A1}$$

where $k\lambda$ is the antenna element separation. Here k is the separation factor which may be 0.5-0.7 in a typical correlated antenna element arrangement. This means that if a reference signal $s_i e^{j\omega t}$ transmitted from the i:th antenna element will arrive at the UE antenna as a weighted sum:

$$s_{UE} = \sum_{i=0}^{N-1} s_i h_i e^{j\omega\left(t - \frac{il}{c}\right)} = e^{j\omega t} \sum_{i=1}^{N-1} s_i h_i e^{-j\frac{jk\lambda\sin(\theta)}{f\lambda}} = e^{j\omega t} \sum_{i=1}^{N-1} s_i h_i e^{-j\frac{ik\sin(\theta)}{fc}}. \tag{A2}$$

Here $\omega$ is the angular carrier frequency, $h_i$ is the complex channel from the i:th antenna element, t is the time, and f, is the carrier frequency. In the above equation $\theta$ and $h_i$ are unknown. There are two ways to handle this.

A first approach is a feedback solution. In such a case, the UE searches for all complex channel coefficients $h_i$ and the unknown angle $\theta$, using dedicated pilot signals like channel state information reference signals (CSI-RS). For this reason the 3GPP LTE standard defines a codebook of beams in different directions given by steering vector coefficients like:

$$w_{m,i} = e^{-jf(m,i)} \tag{A3}$$

where m indicates a directional codebook entry. The UE then tests each codebook and estimates the channel coefficients. The information rate achieved for each codebook entry m is computed and the best one defines the direction and channel coefficients. This is possible since $s_i$ is known. The result is encoded and reported back to the base station. This provides the base station with a best direction, i.e. codebook entry, and information that allows it to build up a channel matrix H. This matrix thus represents the channel from each of the transmit antenna elements to each of the receive antenna elements. Typically, each element of H is represented by a complex number. In this case the reported codebook entry m is also directly mapped to a certain spatial direction. In release 13 LTE this direction consists of both azimuth and elevation angles. The channel matrix can then be used for beamforming computations, or the direction represented by the reported codebook entry can be used directly. In case of MIMO transmission the MIMO beamforming weight matrix, W, needs to be determined so that a best match to the requirement WH=I is achieved where I denotes the identity matrix. In case of an exact match each layer will become independent of other layers. This concept can be applied for single users or multiple users.

A first approach is a reciprocity solution. This second alternative solution can be used when the same frequency band is used in the uplink and the downlink. Electromagnetic theory then proves that reciprocity holds, i.e. it roughly holds that the downlink channel equals the uplink channel, at each point in time and frequency. For each time and frequency, the channel at an antenna can be characterized by a complex number. When reciprocity is used, the channel coefficients can be directly estimated by the base station from UE uplink pilot transmissions. So called sounding reference signals, SRSs, are used for this purpose in LTE. The estimated channel is then used to compute the combining weight matrix according to some selected principle, and then used for downlink beam-formed transmission. Finally, note that the naming of the pilot signals are likely to be changed in the ongoing standardization of 5G wireless in 3GPP.

The techniques available for beamforming are numerous and goes back a long time. More information is available in the many textbooks on antenna theory and beamforming that are publicly available.

Some Beamforming gain basics is, however, discussed here to give a general understanding of the concept.

At the transmit side the available power $P_{Tx}$ is typically equally divided between each antenna element, i.e.

$$P_{element} = P_{Tx}/N. \tag{A4}$$

By selection of a proper phase shift in relation to the antenna element spacing, the amplitude of the radio waves of each antenna element add constructively to give an amplitude that is N times the amplitude of the amplitude from each antenna element. This means that the total power of the beam, far from the array antenna is:

$$P_{beam}=(P_{Tx}/N)N^2=P_{Tx}N. \quad (A5)$$

The transmit antenna gain is therefore ideally N, i.e. 3 dB per doubling of the number of antenna elements.

At the receiver side, each antenna element receives a useful signal power $P_{Rx}$ and generates a noise power $P_{N_0}$. This gives a signal to interference ratio γ per antenna element given by:

$$\gamma_{element}=P_{Rx}/P_{N_0}. \quad (A6)$$

The receiver beamforming then performs coherent combining of all the antenna elements M. The coherent combining amplifies the amplitude of the RF signal a factor of M, i.e. the useful power by a factor of $M^2$, while the noise power adds up to $MP_{N_0}$. The resulting γ after combining becomes:

$$\gamma=P_{Rx}M^2/MP_{N_0}=M\gamma_{element}. \quad (A7)$$

This corresponds to an antenna gain of M, i.e. 3 dB per doubling of the number of antenna elements.

Note that the above estimates are based on the assumption that there is only one combined antenna beam. In case there is more than one beam, the power needs to be divided between the beams, a fact that reduces the antenna gain, range and coverage.

Beamforming may be performed in different ways, e.g. analogue, digital, hybrid or constrained beamforming.

Figure 17:
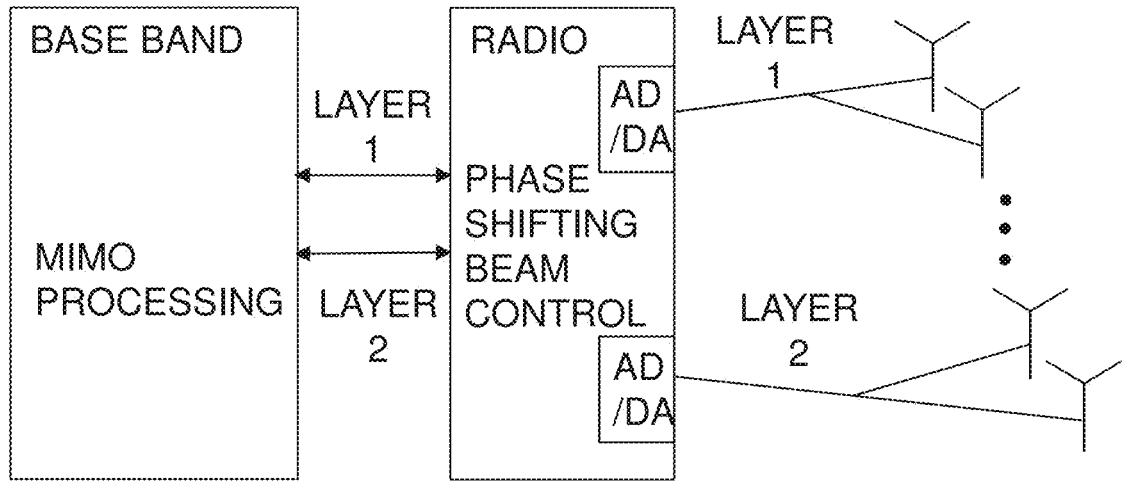
FIG. 17 is a schematic illustration of an example of analogue beamforming.

In case of analogue beamforming, the analogue transmit signal may be sent to a set of antenna elements, one set for each MIMO layer. The phase shift of each antenna in a set is then controlled in a way to create the radio beam, see FIG. 17.

The advantage of this solution is that the digital to analogue conversion does require a number of AD/DA converters that is equal to the number of spatial multiplexing layers. This number is likely to be much lower than the number of antenna elements, since the majority of the degrees of freedom are to be used for beamforming. As stated above the downside is a lack of flexibility in that all resource blocks of a symbol are subject to the same beamforming. This is only consistent with the scheduling of users in a single direction per beam, at each time instant and for all frequencies of the band.

Figure 18:
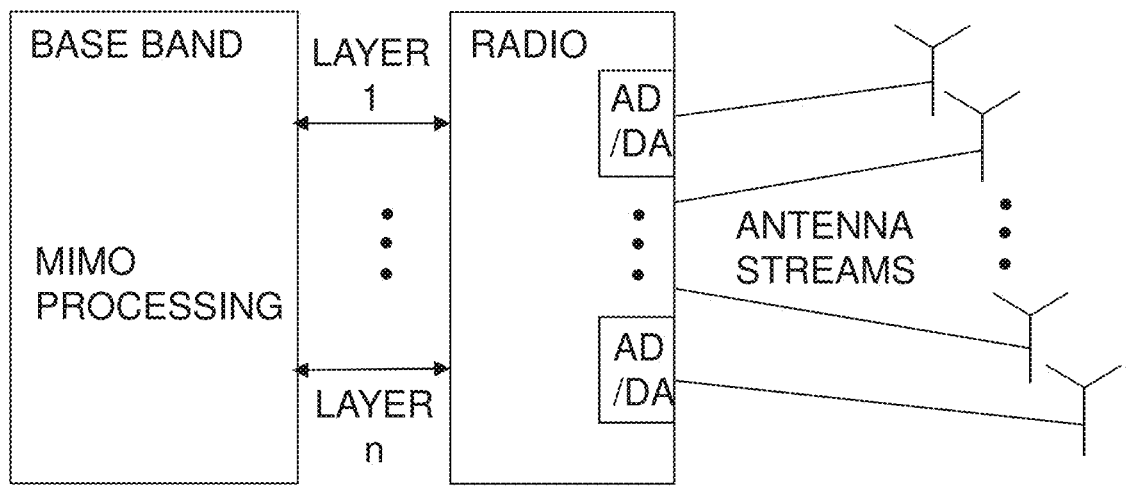
FIG. 18 is a schematic illustration of an example of digital beamforming.

In case of full digital beamforming each antenna element is equipped with a separate AD/DA converter. This allows beamforming weights to be added in base band, rather than in the analogue domain, see FIG. 18.

The advantage of this solution is flexibility, each user can be given a separate beamforming at the same time. It is no longer necessary to limit the scheduling to users in a single direction. The drawback is a need for a large number of AD/DA converters. This drives cost and leads to a large power consumption.

Hybrid beamforming represents an intermediate step between full digital and full analogue beamforming. There are more digital streams than the 2 polarization streams of analogue beamforming sent to the radio. Typically 4, 8, 16, . . . streams are sent. Different architectures are then possible. Perhaps the simplest one is obtained when dividing the antenna array into 2, 4, 8, . . . subarrays, each taking 2 streams with different polarization and performing analogue beamforming for these. This allows a multiplication of the basic analogue number of beam directions with a factor being equal to the number of sub-arrays. Other architectures are however possible as well.

Constrained (digital) beamforming is similar to hybrid beamforming but with greater flexibility since the beamforming in the radio is digital. The limitation of the number of streams between baseband and the radio is then not due to AD/DA conversion constraints but rather interface capacity constraints. This is so since at high carrier frequencies the bandwidths are also large. This in turn results in a very high data rate over each antenna element which is then multiplied by the number of antenna elements. The sum of these data rates easily becomes so large that the interfaces between the baseband and the radio would start to dominate the hardware cost. Such a situation is not an option and therefore the number of digital data streams between the base band and the radio needs to be restricted. This restriction is similar to the one dictated by AD/DA conversion in case of hybrid beamforming. The difference as compared to hybrid beamforming is that the radio may combine/split the digital streams with digital means, this being more flexible than for hybrid beamforming where analogue phase shifting only is usually applied.

APPENDIX B

In code division multiple access (CDMA), users are distinguished by codes, taken from a pre-defined set. In CDMA all users transmit simultaneously in time and frequency. With LTE the fourth spatial multi-antenna dimension was introduced, here multiple transmit and receive antennas allow "parallel channels" to be operated simultaneously, this being known as spatial multiplexing.

The codes in CDMA systems can be selected in many ways, allowing different bit rates with correspondingly different processing gain and SNR requirements to be used. Typically a user may have a number of symbols $S_i$ or data to transmit. Prior to transmission the symbols are then transformed to the chip rate by multiplication with the code $c_u(k)$, k=1, . . . , N, where N is the length of the code and also typically equal to the processing gain. The signal corresponding to the symbol is then $s_{i,u}(k)=S_i c_u(k)$. At the same point in the receiver chain the signal is processed against all user codes, e.g. by correlation processing, resulting in:

$$\hat{S}_i=ks_{i,u}(k)c_v(k)=kNS_i, v=u, \quad (B1)$$

where k represents the overall signal chain gain. In case v≠u the result would be 0 in case the codes are mutually orthogonal.

Abbreviations

3GPP 3rd Generation Partnership Project
4G 4th Generation
5G 5th Generation
AD/DA Analogue-to-Digital/Digital-to-Analogue
ASIC Application Specific Integrated Circuits
BTS Base Transceiver Stations
CD Compact Disc
CDMA Code Division Multiple Access
COTS Common Off-The-Shelf
CPE Customer Premises Equipment
CPU Central Processing Units
CSI-RS Channel State Information Reference Signals
DA Digital-to-Analogue
DSP Digital Signal Processors
DVD Digital Versatile Disc
eNB evolved Node B
FDMA Frequency-Division Multiple Access
FPGA Field Programmable Gate Arrays HDD Hard Disk Drive
HW HardWare
I/O Input/Output
LEE Laptop Embedded Equipment
LME Laptop Mounted Equipment
LTE Long-Term Evolution
MCS Modulation and Coding Scheme
MEM MEMory units
MIMO Multiple Input Multiple Output
ND Network Device
NFV Network Function Virtualization
NI Network Interfaces
NIC Network Interface Controller
NR New Radio
OFDM Orthogonal Frequency Division Multiple access
OS Operating System
OSS Operations and Support System
PC Personal Computer
PDA Personal Digital Assistant
PLC Programmable Logic Controllers
RAM Random Access Memory
REG REGisters
ROM Read-Only Memory
RRU Remote Radio Units
SRS Sounding Reference Signals
STA STAtion
SW SoftWare
TDMA Time Division Multiple Access
UE User Equipment
USB Universal Serial Bus
VM Virtual Machine
VMM Virtual Machine Monitor
VNE Virtual Network Element
WNIC Wireless Network Interface Controller

The invention claimed is:

1. A method for radio communication between a transmitting node and a plurality of receiving nodes, wherein said method comprises:
   determining a beamforming solution comprising a set of beamforming weights that define a directional beam covering respective directions associated with individual receiving nodes in a set of receiving nodes, the beamforming solution being one of an analog beamforming solution, a hybrid beamforming solution, and a constrained beamforming solution;
   forming, via overlay coding, a combined signal stream from individual data streams, each individual data stream corresponding to a respective one in the set of receiving nodes, and each individual data stream encoded into the combined signal stream according to at least one of a respective code-domain overlaid code or a respective frequency-domain overlaid code, such that the individual data streams are separable from the combined signal stream in at least one of the frequency domain and the code domain; and
   transmitting a beamformed radio signal according to the beamforming solution, the beamformed radio signal conveying the combined signal stream, for reception by each of the receiving nodes in the set of receiving nodes.

2. The method according to claim 1, wherein the overlay coding is performed on a per symbol time basis.

3. The method according to claim 1, wherein the combined signal stream comprises more than one layer, wherein each layer represents a spatial pre-coding entity, wherein said overlay-coding of the individual data streams is performed separately for each layer.

4. The method according to claim 1, wherein determining the beam forming solution comprises the transmitting node determining the beam forming solution based on receiving information indicating the respective directions.

5. The method according to claim 4, wherein the transmitting node receives the information from the set of receiving nodes.

6. The method according to claim 1, wherein determining the beam forming solution comprises the transmitting node determining the beam forming solution based on deducing the respective directions.

7. The method according to claim 6, wherein the transmitting node deduces the respective directions by estimating channel coefficients, based on pilot transmissions from said receiving nodes.

8. The method according to claim 1, wherein the beamforming solution is one among two or more beamforming solutions, each beamforming solution defining a corresponding directional beam, wherein the set of receiving nodes is one among two or more sets of receiving nodes, each set of receiving nodes being directionally covered by the corresponding directional beam, wherein the combined signal stream is one of two or more combined signal streams, each combined signal stream targeting a respective one of the two or more sets of receiving nodes, and wherein transmitting the combined signal stream comprises transmitting each of the two or more combined signal streams in a different frequency sub-band, according to the corresponding beamforming solution.

9. The method according to claim 1, further comprising selecting the set of receiving nodes as receiving nodes having respective directions that are within a beam width of the directional beam of each other.

10. The method according to claim 1, wherein the beamforming solution provides two or more high gain directions at a transmit symbol time, and wherein the method includes selecting the set of receiving nodes to reduce the number of said high gain directions.

11. The method according to claim 1, wherein said transmitting node is a base station and the receiving nodes are user equipments, and wherein transmitting the beamformed radio signal is performed in a downlink direction.

12. The method according to claim 1, wherein said transmitting node is a user equipment and said receiving nodes are base stations, and wherein said transmitting of said beamformed radio signal is performed in an uplink direction.

13. A transmitting node configured for radio communication with a plurality of receiving nodes, comprising:
   a transmitter configured for beamformed transmission; and
   processing circuitry operatively associated with the transmitter and configured to:
      determine a beam forming solution comprising a set of beam forming weights that define a directional beam covering respective directions associated with individual receiving nodes in a set of receiving nodes, the beamforming solution being one of an analog beamforming solution, a hybrid beamforming solution, and a constrained beamforming solution;
      form, via overlay coding, a combined signal stream from individual data streams, each individual data stream corresponding to a respective one in the set of receiving nodes, and each individual data stream encoded into the combined signal stream according to at least one of a respective code-domain overlaid code or a respective frequency-domain overlaid code, such that the individual data streams are separable from the combined signal stream in at least one of the frequency domain and the code domain; and transmit, via the transmitter, a beamformed radio signal according to the beam forming solution, the beamformed radio signal conveying the combined signal stream, for reception by each of the receiving nodes in the set of receiving nodes.

14. The transmitting node according to claim 13, wherein said transmitting node further comprises communication circuitry configured to obtain user data comprising the individual data streams.

15. The transmitting node according to claim 13, wherein said processing circuitry is configured to perform the overlay coding on a per symbol time basis.

16. The transmitting node according to claim 13, wherein the combined signal stream comprises more than one layer, wherein each layer represents a spatial pre-coding entity, wherein said overlay-coding of the individual data streams is performed separately for each layer.

17. The transmitting node according to claim 13, wherein said processing circuitry is configured to receive information indicating the respective directions.

18. The transmitting node according to claim 17, wherein said information indicating the respective directions is provided by said receiving nodes.

19. The transmitting node according to claim 13, wherein said processing circuitry is configured to deduce the respective directions.

20. The transmitting node according to claim 19, wherein said processing circuitry is configured to deduce the respective directions from channel coefficients estimated from pilot transmissions received by the transmitting node from said receiving nodes.

21. The transmitting node according to claim 13, wherein the beamforming solution is one among two or more beamforming solutions, each beamforming solution defining a corresponding directional beam, wherein the set of receiving nodes is one among two or more sets of receiving nodes, each set of receiving nodes being directionally covered by the corresponding directional beam, wherein the combined signal stream is one of two or more combined signal streams, each combined signal stream targeting a respective one of the two or more sets of receiving nodes, and wherein the processing circuitry is configured to transmit, via the transmitter, each of the two or more combined signal streams in a different frequency sub-band, according to the corresponding beamforming solution.

22. The transmitting node according to claim 13, wherein said processing circuitry is configured to select said set of receiving nodes as receiving nodes having respective directions that are within a beam width of the direction beam of each other.

23. The transmitting node according to claim 13, wherein the beamforming solution provides two or more high gain directions at a transmit symbol time, and wherein the processing circuitry is configured to select said set of receiving nodes to reduce the number of said high gain directions.

24. The transmitting node according to claim 13, wherein said transmitting node is a base station, and wherein said processing circuitry is configured to transmit, via the transmitter, said beamformed radio signal in a downlink direction.

25. The transmitting node according to claim 13, wherein said transmitting node is a user equipment, and wherein said processing circuitry is configured to transmit said beamformed radio signal in an uplink direction.

26. A non-transitory computer readable storage medium storing a computer program comprising instructions, that when executed by at least one processor, cause the at least one processor to:

determine a beam forming solution comprising a set of beam forming weights that define a directional beam covering respective directions associated with individual receiving nodes in a set of receiving nodes, the beamforming solution being one of an analog beamforming solution, a hybrid beamforming solution, and a constrained beamforming solution;

form, via overlay coding, a combined signal stream from individual data streams, each individual data stream corresponding to a respective one in the set of receiving nodes, and each individual data stream encoded into the combined signal stream according to at least one of a respective code-domain overlaid code or a respective frequency-domain overlaid code, such that the individual data streams are separable from the combined signal stream in at least one of the frequency domain and the code domain; and transmit a beamformed radio signal according to the beam forming solution, the beamformed radio signal conveying the combined signal stream, for reception by each of the receiving nodes in the set of receiving nodes.

* * * * *